T. E. MURRAY, Jr., AND J. B. MURRAY.
METHOD OF ELECTRICAL WELDING.
APPLICATION FILED DEC. 16, 1919.
1,339,968.                                        Patented May 11, 1920.
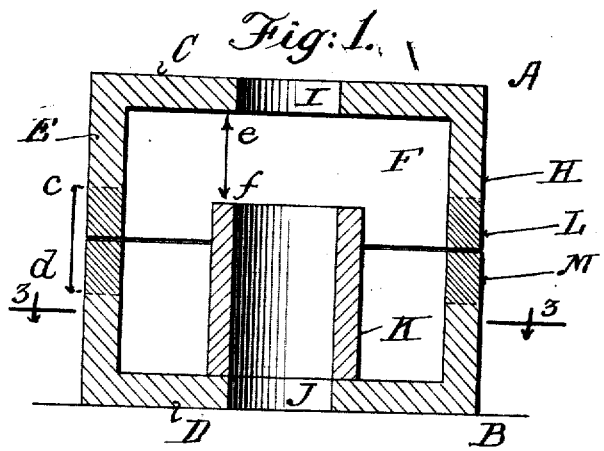
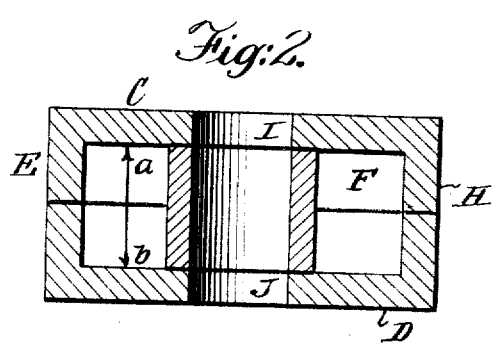
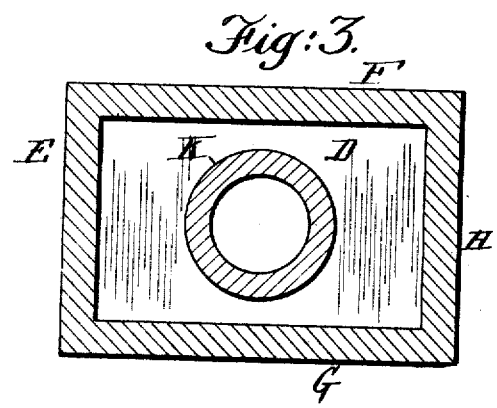
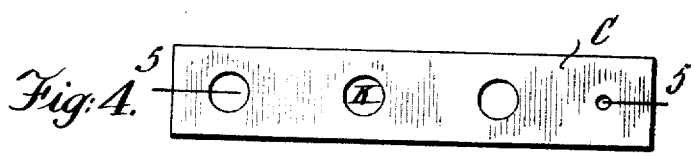
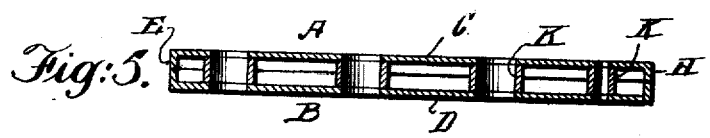

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,339,968.　　　　Specification of Letters Patent.　　Patented May 11, 1920.

Application filed December 16, 1919. Serial No. 345,234.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

The invention is a method of electrically welding a bushing, or a plurality of similar bushings, between flanged plates which are united to form a hollow casing.

In the accompanying drawing—

Figure 1 is a vertical section of the flanged plates which are to be welded together, showing the bushing in place between said plates, the parts being in the position before welding. Fig. 2 is a similar section, showing the parts in position after welding. Fig. 3 is a horizontal section on the line 3, 3 of Fig. 1. Fig. 4 is a plan view of two flanged plates welded together with a plurality of bushings between them. Fig. 5 is a longitudinal section on the line 5, 5 of Fig. 4.

Similar letters of reference indicate like parts.

As here shown, we produce a hollow box casing formed of two sections, each of which comprises a plate C of section A, or D of section B, each plate having four flanges E, F, G, H. In said plates are circular registering openings I, J. K is a bushing, the bore of which registers with the openings I, J, which bushing is to be electrically welded within the sections A, B. The distance $a$, $b$, Fig. 2, between the inner surfaces of the plates C, D of the sections and the corresponding length of the bushing K having been selected, the flanges are provided with take-ups L, M, the united lengths of which—$c$, $d$, Fig. 1—are slightly in excess of the distance $e$, $f$, measured from the top of the bushing, when placed on the plate D of section B, as shown in Fig. 1, to the under surface of the plate C of section A. The welding current being established and the sections pressed together, the metal of the take-ups L, M is first fused and extruded. Before the take-ups are wholly eliminated, the top of the bushing makes contact with said top plate C, and a weld is made between said bushing and said top plate, and also between the bottom of said bushing and the lower plate D, and the bushing is thus secured to both plates and within the casing.

In Figs. 1, 2 and 3, we have shown but one bushing, but a number of bushings, which may be of different diameters, as shown in Figs. 4 and 5, may be welded in the casing simultaneously in the same way. It is not essential that the sections A, B should each have four flanges to produce a box-shaped casing, since two of the opposite flanges, as F, H, may be absent, the casing then becoming tubular, and the take-ups L, M being formed, as before, on the remaining flanges E, G.

We claim:

1. The method of electrically welding a bushing within flanged plates united to form a hollow casing having circular registering openings, which consists in providing said flanges with take-ups unitedly of a predetermined depth, placing the bushing between said plates with its bore in registry with said openings and in contact at one end with one of said plates, the distance between the opposite end of said bushing and the inner surface of the distant plate being slightly less than said united depth of said take-ups, and then establishing the welding current and pressing said sections together until the metal of said take-ups is fused and extruded and the said distant plate makes contact with said bushing; whereby both ends of said bushing are welded to said plates.

2. The method of electrically welding a plurality of bushings simultaneously within flanged plates united to form a hollow casing having a corresponding plurality of circular registering openings, which consists in providing said flanges with take-ups unitedly of a predetermined depth, placing the bushings between said plates with their bores in registry with said openings respectively and each in contact at one end with one of said plates, the distance between the opposite ends of said bushings and the inner surface of the distant plate being slightly less than said united depth of said take-ups, and then establishing the welding current and pressing said sections together until the metal of said take-ups is fused and extruded and the said distant plate makes contact with said bushings; whereby both ends of each of said bushings are welded to said plates.

In testimony whereof we have affixed our signatures in presence of two witnesses.

THOMAS E. MURRAY, Jr.
JOSEPH B. MURRAY.

Witnesses:
GERTRUDE T. PORTER,
MAY T. McGARRY.